(12) United States Patent
Mukai et al.

(10) Patent No.: US 12,199,741 B2
(45) Date of Patent: Jan. 14, 2025

(54) OPTICAL TRANSMISSION SYSTEM, OPTICAL TRANSMISSION DEVICE, AND OPTICAL TRANSMISSION METHOD

(71) Applicant: Fujitsu Limited, Kawasaki (JP)

(72) Inventors: Akihiro Mukai, Fukuoka (JP); Yoshito Kachita, Kawasaki (JP); David Dal Farra, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 202 days.

(21) Appl. No.: 17/954,985

(22) Filed: Sep. 28, 2022

(65) Prior Publication Data

US 2024/0106557 A1 Mar. 28, 2024

(51) Int. Cl.
*H04J 14/02* (2006.01)
*H04B 10/50* (2013.01)

(52) U.S. Cl.
CPC .......... *H04J 14/0212* (2013.01); *H04B 10/50* (2013.01)

(58) Field of Classification Search
CPC .............................. H04B 10/50; H04J 14/0212
USPC ........................................................... 398/45
See application file for complete search history.

(56) References Cited

U.S. PATENT DOCUMENTS

| | | | |
|---|---|---|---|
| 2004/0202469 A1 | 10/2004 | Kawaguchi et al. | |
| 2005/0168806 A1 | 8/2005 | Maeda et al. | |
| 2006/0222366 A1* | 10/2006 | Sugaya | H04B 10/296 398/79 |
| 2008/0080865 A1* | 4/2008 | Muro | H04J 14/0212 398/83 |
| 2008/0095537 A1* | 4/2008 | Sakamoto | H04J 14/0212 398/83 |
| 2011/0142456 A1* | 6/2011 | Takahashi | H04B 10/296 398/152 |
| 2018/0205485 A1* | 7/2018 | Yuki | H04B 10/807 |
| 2018/0278361 A1* | 9/2018 | Nakata | H04B 10/07955 |
| 2020/0076499 A1 | 3/2020 | Al Sayeed et al. | |

(Continued)

FOREIGN PATENT DOCUMENTS

| | | |
|---|---|---|
| JP | 2000-236301 A | 8/2000 |
| JP | 2000-244411 A | 9/2000 |
| WO | WO 2004/057778 A1 | 8/2004 |

OTHER PUBLICATIONS

Elson et al; Investigation of bandwidth loading in optical fibre transmission using amplified spontaneous emission noise; Aug. 2017; Optics Express; pp. 1-9. (Year: 2017).*

*Primary Examiner* — Amritbir K Sandhu
(74) *Attorney, Agent, or Firm* — STAAS & HALSEY LLP

(57) ABSTRACT

An optical transmission device configured to: receive an input of signal interruption information from a second optical transmission device that detects a signal interruption of signal light on a transmission path, and to receive an input of ASE light after the signal interruption, has a wavelength selective switch configured to drop and/or add signal light; a memory; and a processor coupled to the memory. The processor is configured to: switch, based on the input of the signal interruption information from the second optical transmission device, control of output of the wavelength selective switch from a constant level control of the output, to a constant level control of attenuation for holding an amount of the attenuation of the signal light constant; and return the constant level control of the attenuation to the constant level control of the output, after the input of the ASE light.

12 Claims, 11 Drawing Sheets

(56) References Cited

U.S. PATENT DOCUMENTS

2020/0106531 A1\* 4/2020 Kachita ................ H04B 10/674
2024/0106557 A1\* 3/2024 Mukai ................. H04J 14/0212

\* cited by examiner

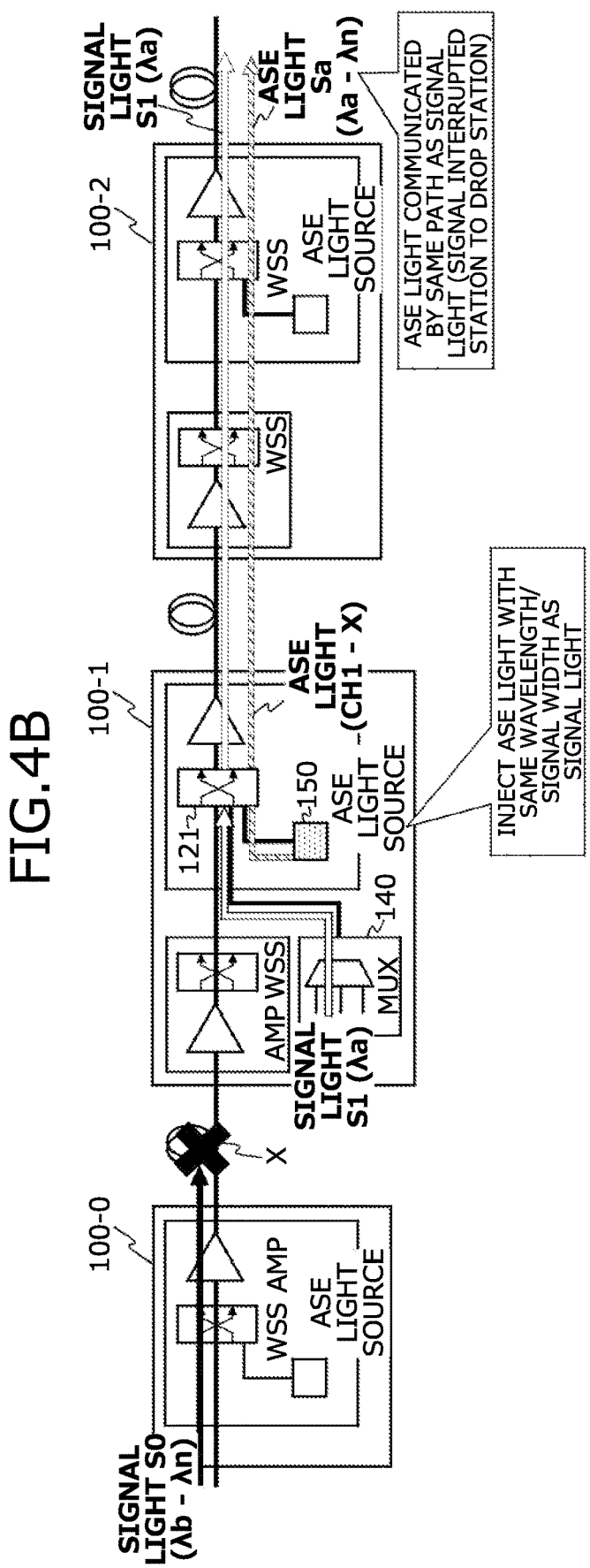

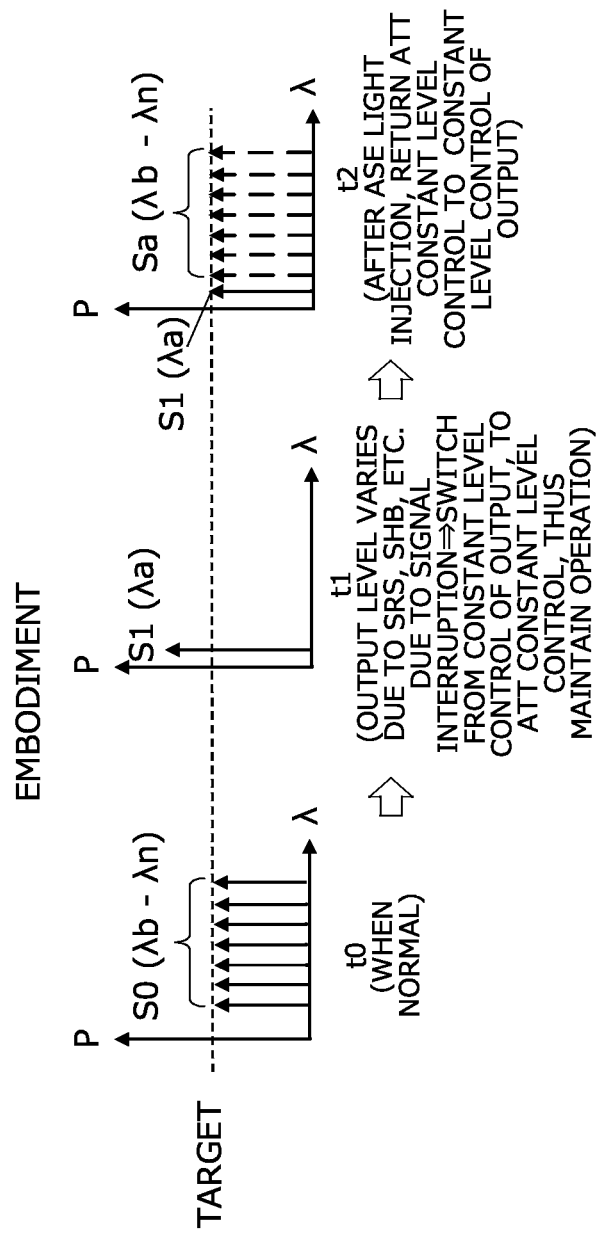

OPTICAL TRANSMISSION SYSTEM, OPTICAL TRANSMISSION DEVICE, AND OPTICAL TRANSMISSION METHOD

FIELD

The embodiments discussed herein relate to optical transmission.

BACKGROUND

In an optical transmission system employing wavelength division multiplexing (WDM), a reconfigurable add/drop multiplexer (ROADM) or an optical cross-connect (OXC) is disposed at each node (station) on a network, whereby signal light of various wavelengths may be added and/or dropped between the ROADMs of the stations. The ROADM and OXC include an optical amplifier, a wavelength selective switch (WSS), etc.

Each station has an internal amplified spontaneous emission (ASE) light source, whereby ASE light is injected during signal interruption of signal light in a transmission line. Signal interruption, for example, occurs naturally or due to intentional fiber severing, fiber removal work, etc. At a station downstream from a fault location where signal interruption has occurred, a decrease in the number of wavelengths of signal light occurs and due to a change such as in stimulated Raman scattering (SRS) or spectral hole burning (SHB), tilt and/or level fluctuations with respect to the signal light being transmitted between downstream stations occurs. To suppress tilt and/or level fluctuations with respect to the signal light, for example, a station that has detected a fault switches to a channel (CH) for which a signal is interrupted and injects ASE light. When the station that has detected the fault detects CH interruption of signal light, the station switches to the built-in ASE light source and downstream stations perform control for the ASE light by a level that is the same as that of the signal light.

One example of a prior art, for example, is a technique in which, when an interruption or a fluctuation is detected for only a portion of the wavelengths, automatic constant-level control is suspended, optical amplifier gain is fixed and the fixed-gain control is performed until the interrupted wavelengths are restored, whereby an occurrence of signal errors of other wavelengths is prevented. According to another technique, when the number of wavelengths changes due to interruption of optical input of signal light of a certain wavelength, the optical amplifier is switched from automatic level control (ALC) to automatic gain control (AGC), the amount of optical attenuation corresponding to the wavelength of the interrupted optical input is set to a maximum value, and restoration is awaited, whereby stabilized optical transmission is performed.

Further, according to another technique, before interruption of optical input of signal light, the level of optical attenuator output is controlled to be constant and when input of the signal light is interrupted, control is switched to controlling the level of attenuation to be constant; in an instance in which the signal light is restored, control is returned to controlling the level of optical attenuator output to be constant, whereby even immediately after restoration of the signal light, optical output is controlled to become a target value. According to yet another technique, to suppress tilt and/or level fluctuations due to a change in SRS, SHB, etc. as a result of a decrease in the number of wavelengths occurring with fiber removal at a station or transmission line, ASE light is injected to a CH through which a signal has passed. For examples, refer to Japanese Laid-Open Patent Publication No. 2000-244411, Japanese Laid-Open Patent Publication No. 2000-236301, Published Japanese-Translation of PCT Application, Publication No. 2004/057778 (U.S. Pat. No. 3,954,072), and U.S. Patent Application Publication No. 2020/0076499.

SUMMARY

According to an aspect of an embodiment, an optical transmission device is configured to receive an input of signal interruption information from a second optical transmission device that detects a signal interruption of signal light on a transmission path, the optical transmission device further configured to receive an input of amplified spontaneous emission light after the signal interruption of the signal light on the transmission path. The optical transmission device includes: a wavelength selective switch configured to drop a portion of the signal light on the transmission path and/or add other signal light to the signal light on the transmission path; a memory; and a processor coupled to the memory. The processor is configured to: switch, based on the input of the signal interruption information from the second optical transmission device, control of output of the wavelength selective switch from a constant level control of the output, to a constant level control of attenuation for holding an amount of the attenuation of the signal light constant; and return the constant level control of the attenuation to the constant level control of the output, after the input of the ASE light.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4B is a diagram depicting the transmission path of signal light during signal interruption.

FIG. 6 is a flowchart depicting an example of transmission control of the optical transmission device when signal interruption is recovered from.

FIG. 8B is a diagram of variation of the signal light level during signal interruption in the embodiment.

DESCRIPTION OF THE INVENTION

First, problems associated with the conventional techniques are discussed. In the conventional techniques, it takes time for ASE light to be injected after signal interruption of a CH due to fiber removal because time for detecting the signal interruption by a detecting unit of a photodiode (PD), optical channel monitor (OCM), etc. and time for switching to ASE injection by a WSS is necessary and, for example, an injection delay of a total of about 10 seconds after the signal interruption occurs. In addition, when output is controlled to be constant for all CHs during the period of injection delay of about 10 seconds, at a station downstream from a fault location, it takes time for WSS control to converge remaining CHs having a decreased number of wavelengths to a target level. Thereafter, when ASE light is input, again due to the SRS change, it takes more time until the WSS control converges. Therefore, signal light injected at a station downstream from a fault location takes time converge the signal levels during signal interruption and stable transmission is not performed.

Embodiments of a disclosed optical transmission system, optical transmission device, and optical transmission method are described in detail with reference to the accompanying drawings. The optical transmission device, for example, is a ROADM or an OXC disposed at each station (node) of a predetermined network. The stations are connected in a network, whereby an optical transmission system is built in which signal light of an arbitrary wavelength may be dropped, added, and transmitted between the stations.

When a signal interruption fault occurs on a transmission line due to fiber removal, the optical transmission device of the embodiment suppresses level fluctuations of signal light added by a station downstream from the fault location and thereby, performs stable transmission. In the following description, signal light added by a station downstream from a location where a fault occurred may be called added light.

Figure 1:
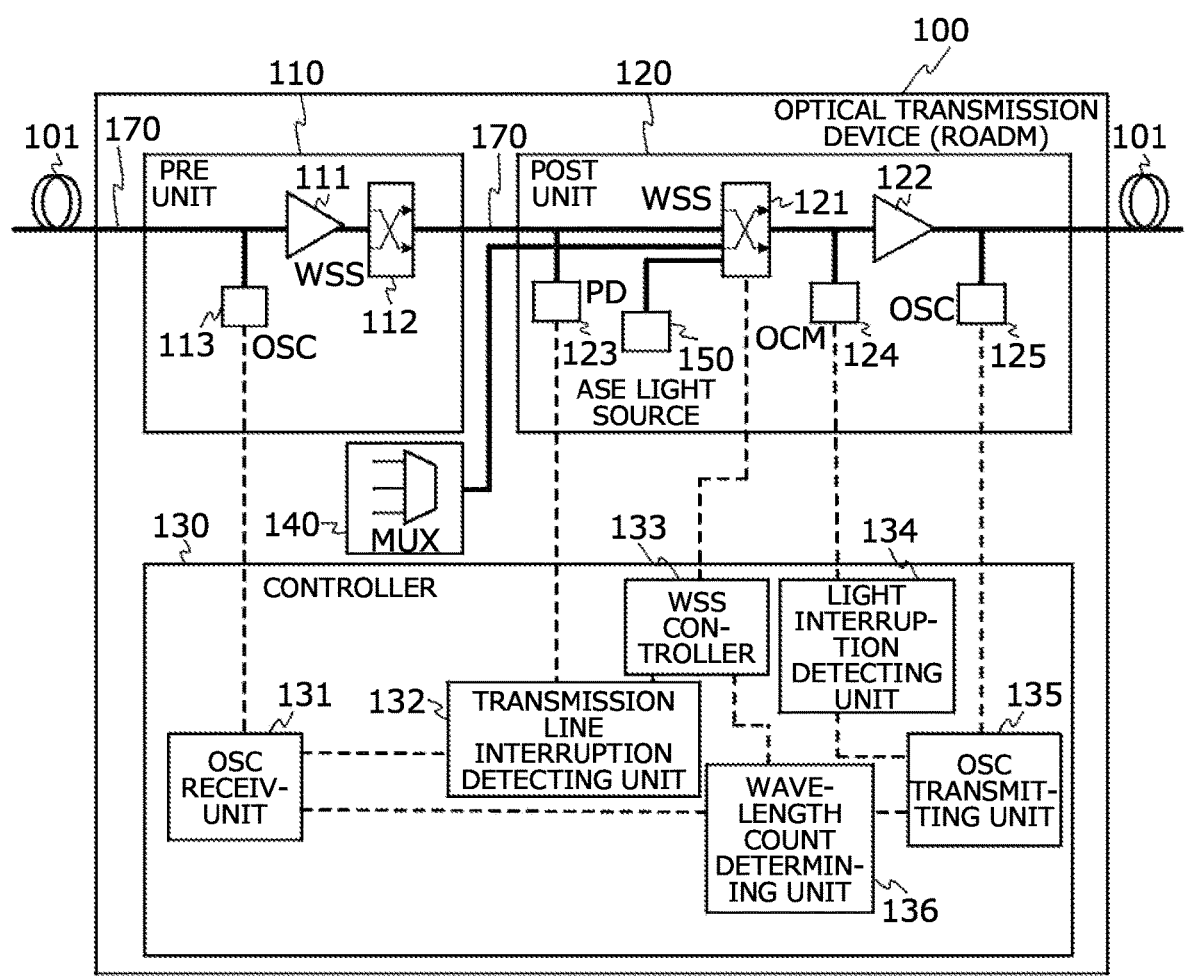
FIG. 1 is a diagram depicting a configuration of an optical transmission device according to an embodiment.

FIG. 1 is a diagram depicting a configuration of the optical transmission device according to the embodiment. First, an outline of the optical transmission device according to the embodiment is described. FIG. 1, for example, depicts an optical transmission device 100 configured by a ROADM.

The optical transmission device 100 includes a PRE unit 110 that is upstream, a POST unit 120 that is downstream, a controller 130, a multiplexer (MUX) 140, and an ASE light source 150. In the optical transmission device 100, the upstream PRE unit 110 is connected to an end of a transmission path 101 such as an optical transmission line that optically transmits signal light on a network, and through an internal path 170 of the optical transmission device 100, is further connected to another end of the transmission path 101 via the POST unit 120.

The PRE unit 110 includes, disposed on the internal path 170, an optical amplifier (AMP) 111, a WSS 112, and an optical supervisory channel (OSC) 113 disposed at a branched output that is upstream from the optical amplifier 111. With respect to signal light on the transmission path 101, the OSC 113 drops or adds an OSC signal (monitoring signal) of a different wavelength band.

The optical amplifier 111 optically amplifies signal light on the internal path 170. The WSS 112 arbitrarily adds/drops signal light of various wavelengths. Under the control of the WSS controller 133, the WSS 112 performs constant level control of output during normal operation. Constant level control of output performs attenuation control so that the output level of signal light of various wavelengths input to the WSS 112 becomes a predetermined target level.

The WSS controller 133 of a downstream optical transmission device 100 that is a station downstream from a station that detected signal interruption of signal light performs, as WSS control, constant level control of the output during a normal state and in an instance of signal interruption, performs control of temporarily switching to constant level control of the attenuation (ATT constant level control) during a period until ASE light is injected. In the ATT constant level control, control is performed to hold (fix) an attenuation amount with respect to input signal light (added light) to be constant. The WSS control of switching the constant level control of the output and the ATT constant level control is described in detail hereinafter.

In FIG. 1, for the sake of convenience, while dropping of signal light by a WSS 121 is not depicted, signal light of an arbitrary wavelength may be dropped. The OSC 113 extracts an OSC signal from signal light transmitted on the internal path 170.

The controller 130 supervises overall control of the optical transmission device 100. The present embodiment describes an example of performing control so that the optical transmission device 100 downstream from the failure location transmits, in a stable state, signal light that is added or transmitted through the optical transmission device 100 when mainly interruption of a signal transmitted on the transmission path 101 occurs. In FIG. 1, solid lines represent the transmission path of signal light and dashed lines represent control paths of electrical signals.

When signal interruption on a trunk is detected by another optical transmission device 100 upstream on the network from the optical transmission device 100, the other optical transmission device 100 includes signal interruption information in an OSC signal and outputs the OSC signal superimposed on signal light. The OSC signal, for example, includes identification information, etc. of the optical transmission device 100 that detected the signal interruption. Further, the OSC 113 of the PRE unit 110 depicted in FIG. 1 receives the OSC signal that is output when the other optical transmission device 100 that is upstream on the network detects the signal interruption.

The POST unit 120 includes the WSS 121 and an optical amplifier 122 disposed on the internal path 170. Further, the POST unit 120 includes a light detecting unit (PD) 123 disposed at a branched output on the internal path 170 upstream from the WSS 121, and an optical channel monitor (OCM) 124 disposed at a branched output on the internal path 170 downstream from the WSS 121. Further, the POST unit 120 includes an OSC 125 disposed at a branched output downstream from the optical amplifier 122.

The light detecting unit (PD) 123 is disposed at a branched output on the internal path 170 upstream from the WSS 121 and detects a presence/absence of signal light on the internal path 170. The OCM 124 is disposed at a branched output downstream from the WSS 121 and monitors signal light output by the WSS 121 for each wavelength (channel). The OSC 125 is disposed in a form so as to drop input downstream from the optical amplifier 122 and during signal interruption, includes signal interruption information in an OSC signal and outputs the OSC signal superimposed on signal light on the internal path 170, to an external destination.

In the configuration example depicted in FIG. 1, the MUX 140 is connected to the WSS 121. The MUX 140 multiplexes signal light (added light) that is to be added and that is from the station in which the optical transmission device 100 is disposed; the MUX 140 outputs the multiplexed signal light to the WSS 121. In FIG. 1, while not depicted, a demultiplexer (DEMUX) is connected to the WSS 121, whereby signal light of a predetermined wavelength to be dropped from the signal light received by the optical transmission device 100 may be dropped via the DEMUX.

Further, the ASE light source 150 is connected to the WSS 121. The controller 130 of the optical transmission device 100 that detected the signal interruption outputs ASE light to the internal path 170 (the transmission path 101) instead of the signal light of the interrupted signal, via the WSS 121.

Here, the controller 130 selectively executes multiple internal functions, based on whether the optical transmission device 100 of the controller 130 directly detected the signal interruption of the signal light of the transmission path 101.

(1) In an instance in which the optical transmission device 100 of the controller 130 has detected the signal interruption of the signal light input from the transmission path 101 or the signal interruption of the OSC signal, the controller 130 determines that the signal interruption is of the signal light for the optical transmission device 100 thereof and that the optical transmission device 100 thereof is located furthest upstream with respect to the location of the signal interruption.

The controller 130 of this upstream optical transmission device 100 executes functions of an OSC receiving unit 131, a transmission line interruption detecting unit 132, a WSS controller 133, a light interruption detecting unit 134, and an OSC transmitting unit 135, among functions thereof.

In an instance of signal interruption in which the OSC signal is undetectable by the OSC 113, the OSC receiving unit 131 outputs this signal interruption information to the transmission line interruption detecting unit 132. The transmission line interruption detecting unit 132 receives input of the signal interruption information from the OSC receiving unit 131 and when the light detecting unit 123 detects signal light "no", signal interruption of the signal light input to the optical transmission device 100 is detected.

In this instance, the transmission line interruption detecting unit 132 causes the WSS controller 133 to input ASE light of the ASE light source 150 to the WSS 121 according to the wavelength of the interrupted signal. The WSS controller 133 performs control of switching the port of the WSS 121, based on the instruction of the transmission line interruption detecting unit 132. Further, the WSS controller 133 controls the WSS 121 to output ASE light to a downstream station via the transmission path 101, instead of the signal light of the interrupted signal. Here, the WSS 121 outputs ASE light corresponding to wavelengths of the number of multiple CHs for which signal interruption occurred.

Based on the presence/absence of signal interruption by a monitor of the OCM 124, the light interruption detecting unit 134 transmits an OSC signal carrying signal interruption information via the OSC 125 to the downstream station via the OSC transmitting unit 135, during signal interruption.

Further, after outputting the ASE light to the downstream station, the light interruption detecting unit 134 detects a state of transient restoration of the signal, via the OCM 124. In this instance, the light interruption detecting unit 134 outputs from the OSC transmitting unit 135 to the downstream station, via the OSC 125, an OSC signal that is in a transient signal state recovered from the signal interruption.

(2) In an instance of the controller 130 detecting an OSC signal including signal interruption information, the controller 130 determines that another optical transmission device 100 upstream from the optical transmission device 100 of the controller 130 is the location of the signal interruption and that the optical transmission device 100 of the controller 130 is located downstream from the location of the signal interruption. In this instance, the optical transmission device 100 of the controller 130 does not detect, in the optical transmission device 100 of the controller 130, the signal light or the signal interruption of the OSC signal input from the transmission path 101.

The controller 130 of this optical transmission device 100 located downstream executes downstream functions, among functions of the controller 130, based on the signal interruption information included in the OSC signal transmitted by the upstream optical transmission device 100. For example, the controller 130 executes the functions of the OSC receiving unit 131, the WSS controller 133, the OSC transmitting unit 135, and a wavelength count determining unit 136.

The OSC receiving unit 131 outputs the OSC signal for the signal interruption received from the upstream optical transmission device 100, via the OSC 113, to the wavelength count determining unit 136. The wavelength count determining unit 136 determines whether variation of the number of wavelengths, i.e., the number of signal interrupted CHs is at least equal to a predetermined threshold.

When the number of signal interrupted CHs is at least equal to the predetermined threshold (for example, 5 CHs or more), the wavelength count determining unit 136 outputs notification that the threshold is exceeded to the WSS controller 133. In this instance, the WSS controller 133 temporarily performs constant level control of the attenuation (ATT constant level control) with respect to the WSS 121 during a period until the injection (transient signal restoration) of the ASE light is detected. Further, the wavelength count determining unit 136 further forwards the received OSC signal for the signal interruption to a downstream optical transmission device 100, via the OSC transmitting unit 135. When the number of signal interrupted CHs is less than the threshold, SRS fluctuation is small and therefore, signal level fluctuation, etc. is less likely to occur and when a reduction of the number of wavelengths due to provisioning leads to a permanently reduced state, the threshold determination performed by the wavelength count determining unit 136, for example, may be excluded. In other words, after wavelength reduction by provisioning, permanently switching to constant level control of the attenuation may be avoided. As a result, optimal WSS control may be performed according to the number of wavelengths subject to signal interruption.

Further, when the wavelength count determining unit 136 detects, via the OSC 113, ASE light injection, i.e., transient signal restoration by the upstream optical transmission device 100, the WSS controller 133 performs switching to return the WSS 121 to the normal constant level control of the output, from the ATT constant level control.

The configuration example depicted in FIG. 1 is an example a configuration in which a single optical transmission device 100 has the PRE unit 110 and the POST unit 120. In this instance, transmission of information between the PRE unit 110 and the POST unit 120 is by an exchange of electrical signals between, for example, packet transmitting units, without passing through the internal path 170. For example, between the OSC receiving unit 131 of the PRE unit 110 and the transmission line interruption detecting unit 132 of the POST unit 120, and between the OSC receiving unit 131 of the PRE unit 110 and the wavelength count determining unit 136 of the POST unit 120, information is transmitted and received directly by electrical signals.

Further, at the time of recovery from this signal interruption when signal interruption that was a main cause is resolved, the control unit 130 performs control for this time of recovery from signal interruption. While described in detail hereinafter, as an outline of the control, at the upstream optical transmission device 100 that detected the signal interruption, a process of returning from the ASE light used during the transient signal restoration, the transmitted signal light to the original signal light transmitted prior to the signal interruption is performed. Further, at the downstream optical transmission device 100, corresponding to switching from the ASE light to the original signal light, similarly as described above, control of the WSS 121 is implemented in a sequence of: constant level control of the output→ATT constant level control→constant level control of the output.

Figure 2:
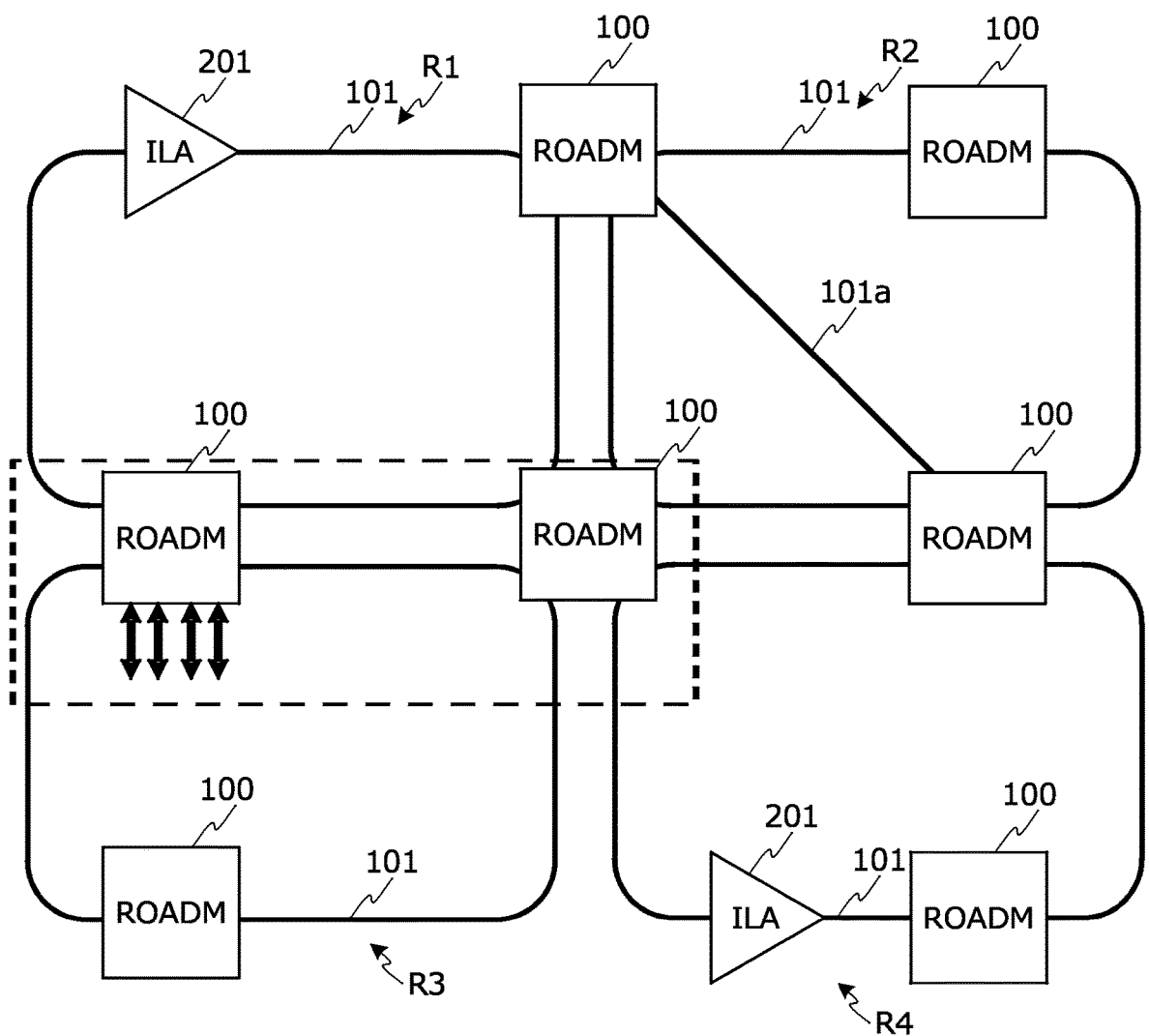
FIG. 2 is a diagram depicting an example of a configuration of an optical transmission system according to the embodiment.

FIG. 2 is a diagram depicting an example of a configuration of the optical transmission system according to the embodiment. As depicted in FIG. 2, the optical transmission devices 100 such as ROADMs that are stations, for example, are connected in a network as a ring network R (R1 to R4) in which the transmission path 101 has a ring-shape.

On the transmission path 101, an optical amplification relay device 201 such as an in-line amplifier (ILA) may be disposed. The ILA 201 compensates fiber loss of an optic fiber constituting the transmission path 101 by optical amplification. Further, like a transmission path 101a, arbitrary optical transmission devices 100 may be directly connected.

Figure 3A:
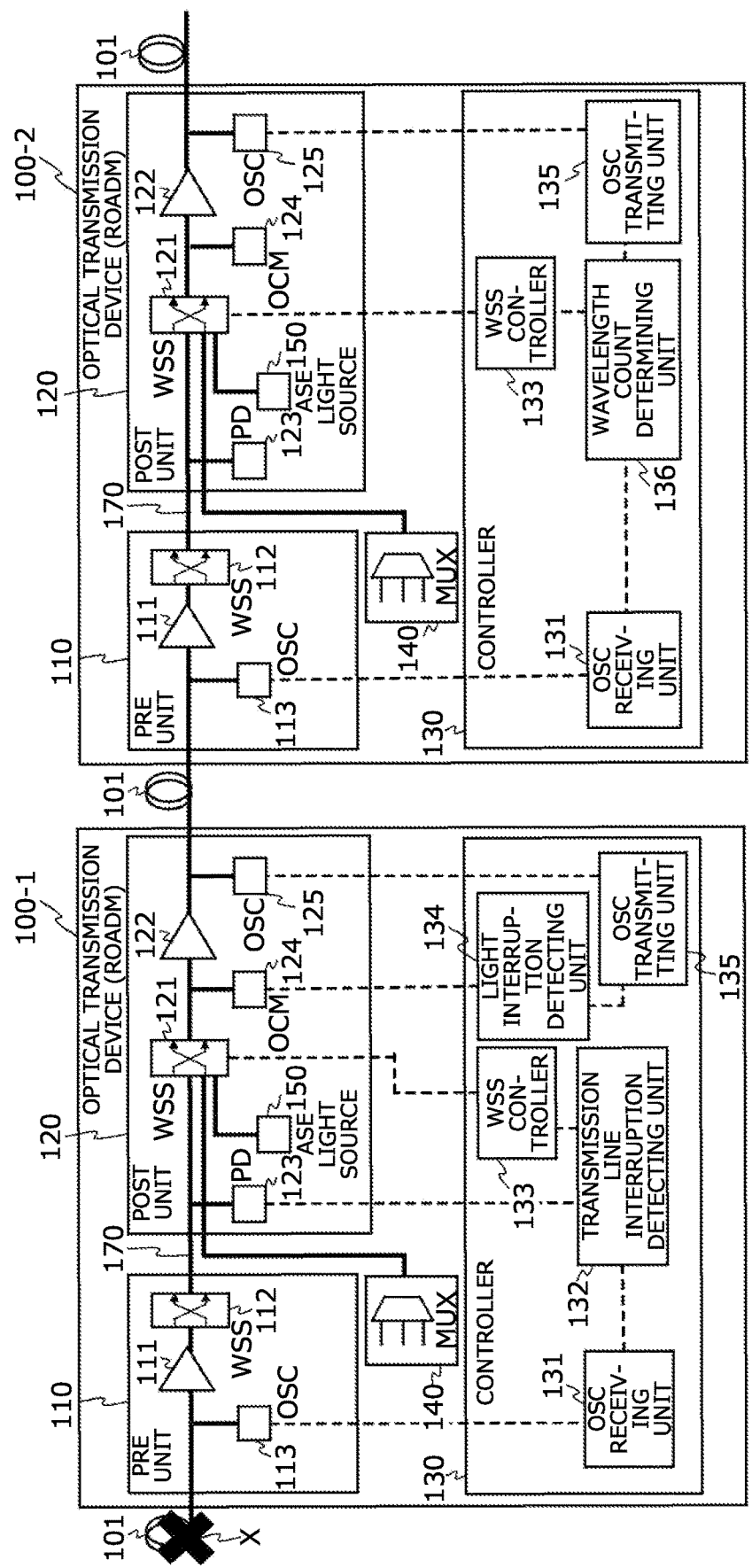
FIG. 3A is a diagram depicting an example of connection configuration of two optical transmission devices.

FIG. 3A is a diagram depicting an example of connection configuration of two optical transmission devices. In FIG. 3A, for example, a connection configuration of two of the optical transmission devices 100 that are ROADMs, etc. constituting stations indicated by dotted lines in FIG. 2 is depicted, and parts identical to those in FIG. 1 are given the same reference characters used in FIG. 1. FIG. 3A depicts a state of signal interruption due to removal of a fiber of the transmission path 101 from an input port of an optical transmission device 100-1 that is upstream (fault location X). Further, in FIG. 3A, functions of the controller 130 above include functions performed by the optical transmission device 100-1 that is upstream and functions performed by an optical transmission device 100-2 that is downstream.

As depicted in FIG. 3A, the controller 130 of the optical transmission device 100-1 that is upstream detects that the optical transmission device 100-1 thereof detects signal interruption at a fault location X. As a result, the controller 130 executes functions of the OSC receiving unit 131, the transmission line interruption detecting unit 132, the WSS controller 133, the light interruption detecting unit 134, and the OSC transmitting unit 135, among the functions thereof.

On the other hand, the controller 130 of the optical transmission device 100-2 that is downstream executes functions of the OSC receiving unit 131, the WSS controller 133, the OSC transmitting unit 135, and the wavelength count determining unit 136, based on signal interruption information included in an OSC signal transmitted from the optical transmission device 100-1 that is upstream.

First, functions executed by the controller 130 of the upstream optical transmission device 100-1 that detected the signal interruption are described. Based on an OSC signal detected by the OSC 113, the OSC receiving unit 131 outputs signal interruption information to the transmission line interruption detecting unit 132, when the OSC signal is interrupted. The transmission line interruption detecting unit 132 determines that input of signal light to the optical transmission device 100-1 is interrupted, based on the signal interruption information of the OSC signal output by the OSC receiving unit 131 or the signal interruption information of the signal light detected by the light detecting unit 123. Without limitation hereto, the transmission line interruption detecting unit 132 may determine that the input of signal light to the optical transmission device 100-1 is interrupted, based on signal interruption information of the OSC signal output by the OSC receiving unit 131 and the signal interruption information of the signal light detected by the light detecting unit 123.

In this instance, the transmission line interruption detecting unit 132 causes the WSS controller 133 to input ASE light of the ASE light source 150 to the WSS 121. Further, the WSS controller 133 controls the WSS 121 to output to the downstream station (the optical transmission device 100-2), ASE light instead of the signal light of the interrupted signal.

Here, with respect to the ASE light supplied to the WSS 121, the WSS controller 133 performs controls so that ASE light of a same signal bandwidth, same number of wavelengths (number of CHs), and same wavelength band as that of the signal light of the interrupted signal is output.

Based on the presence/absence of signal interruption by a monitor of the OCM 124, the light interruption detecting unit 134, at the time of signal interruption, transmits signal interruption information via the OSC transmitting unit 135, to the downstream station via the OSC 125. Here, the OSC signal, for example, includes the number of signal interrupted CHs in addition to the identification information of the optical transmission device 100-1 that detected the signal interruption.

Further, the light interruption detecting unit 134, after outputting the ASE light to the downstream station, detects a state of transient restoration of the signal, via the OCM 124. In this instance, the light interruption detecting unit 134 transmits, from the OSC transmitting unit 135 to the downstream station, via the OSC 125, an OSC signal that is a state of transient recovery of the signal from the signal interruption.

Next, functions executed by the controller 130 of the optical transmission device 100-2 that is downstream are described. The OSC receiving unit 131, via the OSC 113, outputs the OSC signal for the signal interruption received from the upstream optical transmission device 100, to the wavelength count determining unit 136. The wavelength count determining unit 136 determines whether variation of the number of wavelengths, i.e., the number of signal interrupted CHs is at least equal to a predetermined threshold. The threshold (the number of signal interrupted CHs), for example, is 5 wavelengths (5 CHs), and set to be a number of CHs capable of at least suppressing fluctuation of SHB and SRS.

When the number of signal interrupted CHs is at least equal to the predetermined threshold (for example, 5 CHs or more), the wavelength count determining unit 136 outputs notification that the threshold is exceeded to the WSS controller 133. In this instance, the WSS controller 133 temporarily performs constant level control of the attenuation (ATT constant level control) with respect to the WSS 121 during a period until the injection (transient signal restoration) of the ASE light is detected. Further, the wavelength count determining unit 136 further forwards the received OSC signal for the signal interruption to a downstream optical transmission device 100, via the OSC transmitting unit 135.

Further, when the wavelength count determining unit 136 detects, via the OSC 113, ASE light injection, i.e., transient signal restoration by the upstream optical transmission device 100, the WSS controller 133 performs switching to return the WSS 121 to the normal constant level control of the output, from the ATT constant level control.

Further, at the time of recovery from this interruption for which signal interruption was a main cause is resolved, the controller 130 of the optical transmission device 100-1 that is upstream performs control for this recovery from signal interruption. While described in detail hereinafter, as an outline of the control, the optical transmission device 100-1 that is upstream performs control to switch and return the transmitted ASE light to the original signal light transmitted before the signal interruption. Further, at the optical transmission device 100-2 that is downstream, based on the switching of the ASE light to the original signal light at the upstream optical transmission device 100-1, control of the WSS 121 is implemented in a sequence of: constant level control of the output→ATT constant level control→constant level control of the output.

Figure 3B:
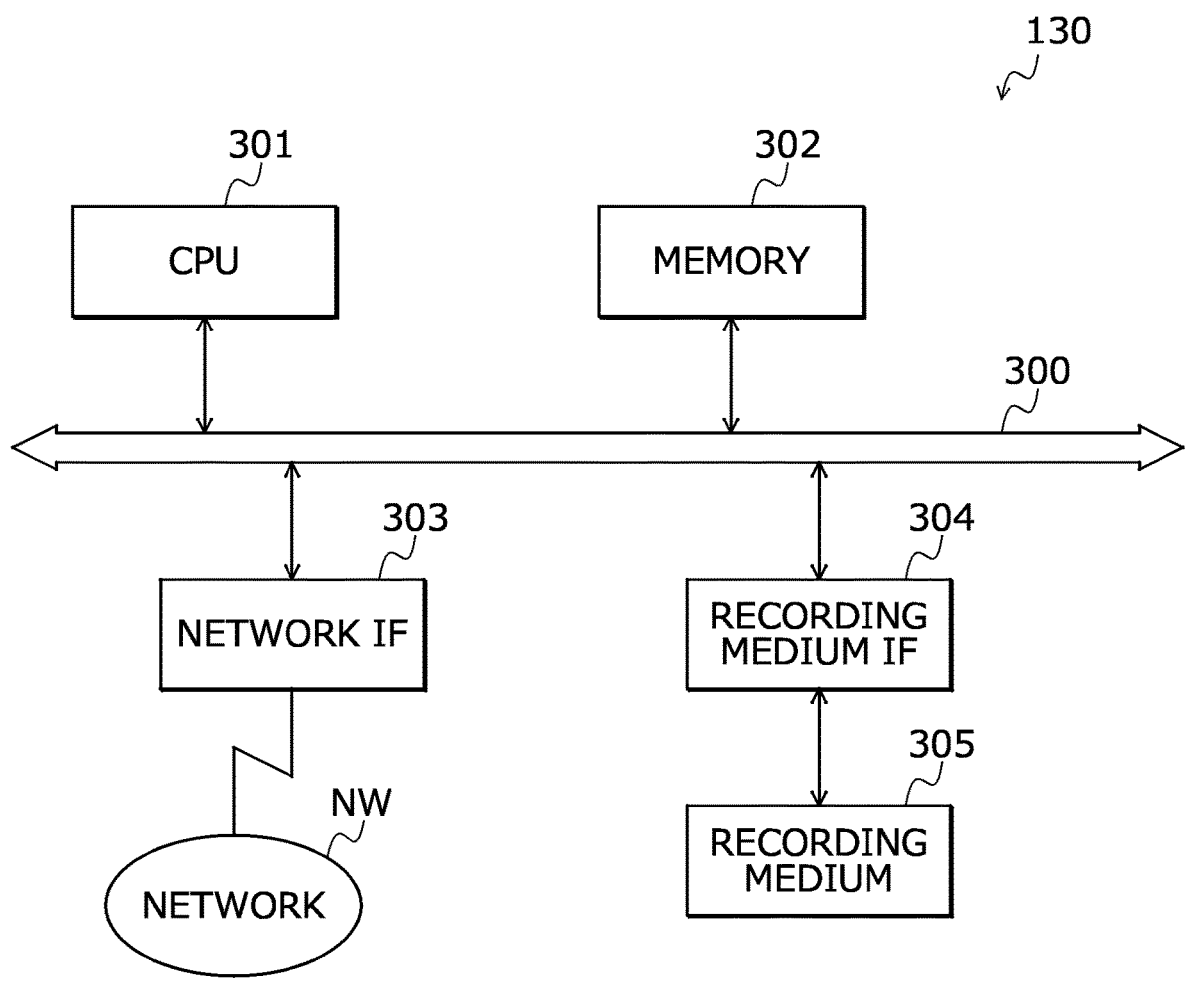
FIG. 3B is a diagram depicting an example of a hardware configuration of a controller of the optical transmission device.

FIG. 3B is a diagram depicting an example of a hardware configuration of the controller of the optical transmission device. For example, the controller 130 may be configured by hardware depicted in FIG. 3B. For example, the controller 130 has a processor 301 such as a central processing unit (CPU), a memory 302, a network interface (IF) 303, a recording medium IF 304, and a recording medium 305. Further, components are connected to one another by a bus 300.

Here, the processor 301 is a controller governing overall control of the controller 130. The processor 301 may have multiple cores. The memory 302, for example, includes a read only memory (ROM), a random access memory (RAM), and a flash ROM, etc. In particular, for example, the flash ROM stores control programs, the ROM stores application programs, and the RAM is used a work area of the processor 301. Programs stored to the memory 302 are loaded onto the processor 301, whereby encoded processes are executed by the processor 301.

The network IF 303 administers an internal interface with a network NW and controls the input and output of information with respect to other optical transmission devices 100.

The recording medium IF 304, under the control of the processor 301, controls the reading and writing of data with respect to the recording medium 305. The recording medium 305 stores therein data written thereto under the control of the recording medium IF 304.

The controller 130, in addition to the components above, for example, may be connectable to an input device, display, etc., via an IF.

The processor 301 depicted in FIG. 3B, by executing a program, may implement the functions of the transmission line interruption detecting unit 132, the WSS controller 133, the light interruption detecting unit 134, and the wavelength count determining unit 136 of the controller 130 depicted in FIG. 3A.

Further, the network IF 303 depicted in FIG. 3B performs transmission between multiple optical transmission devices 100 by electrical signals, in addition to transmission by optical communication on the transmission path 101. For example, the OSC 113 and the OSC 125 connected to branches on the transmission path 101 depicted in FIG. 3A are used, whereby the OSC receiving unit 131 and the OSC transmitting unit 135 exchanged OSC information with each other. Additionally, the controller 130 may exchange information with an external device, via the network IF 303.

Figure 4A:
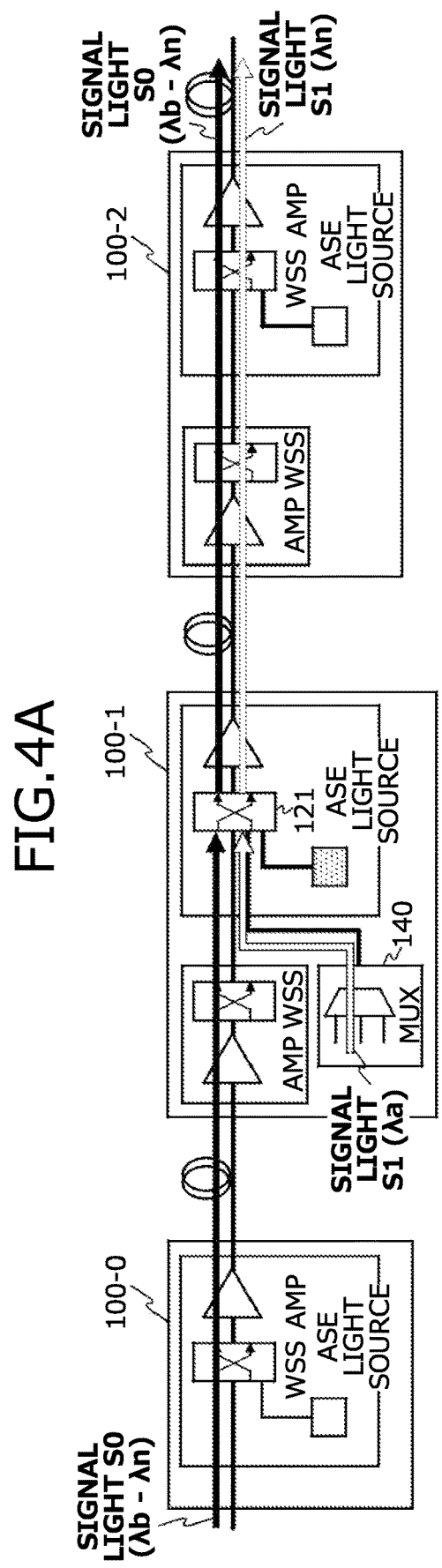
FIG. 4A is a diagram depicting a transmission path of signal light during a normal state.

Next, path switching of signal light for a normal state and during signal interruption according to the embodiment is described. FIG. 4A is a diagram depicting a transmission path of signal light during a normal state. FIG. 4A depicts a state in which three of the optical transmission devices 100 are disposed along the transmission path 101. During the normal state, via the transmission path 101, the wavelength-multiplexed signal light S0 of wavelengths λb to λn for each CH is transmitted from the optical transmission device 100-0 farthest upstream, via the intermediate optical transmission device 100-1, to the optical transmission device 100-2 that is downstream.

Further, at the intermediate optical transmission device 100-1, signal light (added light) S1 of an arbitrary single wavelength λa is output to the WSS 121, via the MUX 140. The WSS 121, in addition to the signal light S0, wavelength-multiplexes and outputs the added signal light (added light) S1 of the wavelength λa on the transmission path 101. In FIG. 4A, for the sake of convenience, while the signal light S0 and the signal light S1 are depicted separated, the WSS 121 wavelength-multiplexes and transmits the signal light S0 and the signal light S1 of the wavelengths λa to λn.

FIG. 4B is a diagram depicting the transmission path of signal light during signal interruption. A state is depicted in which, after the normal transmission state depicted in FIG. 4A, signal interruption occurs on the transmission path 101 between the optical transmission device 100-0 farthest upstream and the intermediate optical transmission device 100-1 (fault location X). The signal interruption occurs for various reasons such severing of the optic fiber such as when, for example, the optic fiber of the transmission path 101 for the intermediate optical transmission device 100-1 is removed by certain work. In this instance, at the intermediate optical transmission device 100-1, signal interruption of the signal light input thereto is detected and information about the signal interruption at the optical transmission device 100-1 is transmitted by an OSC signal to the optical transmission device 100-2 that is downstream.

In this instance, at the intermediate optical transmission device 100-1, the signal interruption of the signal light input thereto is detected and information about the signal interruption at the optical transmission device 100-1 is transmitted by an OSC signal to the optical transmission device 100-2 that is downstream. Further, the intermediate optical transmission device 100-1 injects ASE light Sa of the same wavelength and signal width as that of the signal light from the ASE light source 150 to the WSS 121. The ASE light Sa has the same wavelength band, number of wavelengths (number of CHs), and signal width as that of the signal light of the interrupted signal and is transmitted to the optical transmission device 100-2 that is downstream.

Further, before the signal interruption, the signal light (added light) S1 injected by the intermediate optical transmission device 100-1 is transmitted as is to the optical transmission device 100-2 that is downstream. In the example depicted in FIG. 4B, a drop station of the signal light S1 is farther downstream than is the optical transmission device 100-2 and the optical transmission device 100-2 transmits (passes) the signal light S1. Here, the ASE light Sa is communicated by the same path as that for the signal light S1. As a result, the signal light S1 may be transmitted continuously before and after the signal interruption, between the intermediate optical transmission device 100-1, which is the signal interrupted station, and the branched (Drop) station.

Figure 5:
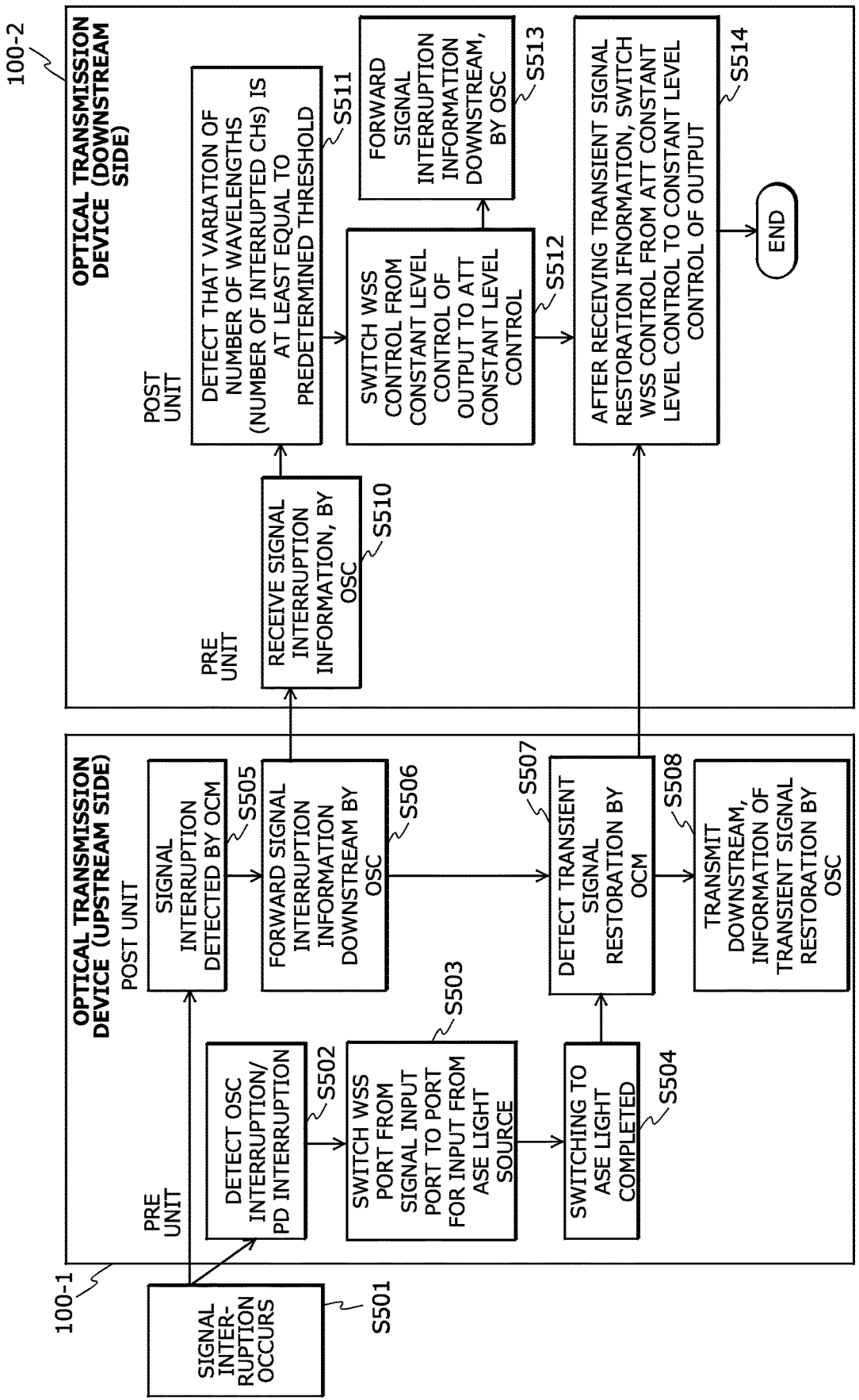
FIG. 5 is a flowchart depicting an example of transmission control of the optical transmission device when signal interruption occurs.

FIG. 5 is a flowchart depicting an example of transmission control of the optical transmission device when signal interruption occurs. FIG. 5 depicts control procedures implemented, respectively, by the optical transmission device 100-1 that is upstream and the optical transmission device 100-2 that is downstream and depicted in FIG. 3A.

A signal light input to the optical transmission device 100-1 that is upstream is assumed to be interrupted at the fault location X (step S501). In this instance, at the optical transmission device 100-1 that is upstream, the OSC receiving unit 131 detects the signal interruption of the OSC signal, and the light detecting unit 123 detects the signal interruption of the signal light (step S502). The transmission line interruption detecting unit 132 determines that input of the signal light to the optical transmission device 100-1 is interrupted, based on the signal interruption of the OSC signal output by the OSC receiving unit 131 or the signal interruption of the signal light by the light detecting unit 123.

Further, the transmission line interruption detecting unit 132 causes the WSS controller 133 to switch the port of the WSS 121 from the signal input port to the input port for input from the ASE light source 150 (step S503). As a result, ASE light of the ASE light source 150 is output to the optical transmission device 100-2 that is downstream, via the WSS 121.

Further, the signal interruption that occurred due to step S501 is detected by the OCM 124 as a signal interruption (step S505). Based on the signal interruption detection of the OCM 124, the light interruption detecting unit 134 forwards an OSC signal of the signal interruption from the OSC transmitting unit 135 to the optical transmission device 100-2 that is downstream, via the OSC 125 (step S506).

When the switching from the signal light to the ASE light is completed by processes at step S503 (step S504), the OCM 124 detects a state of transient restoration of the signal by the ASE light (step S507). As a result, the light interruption detecting unit 134 transmits an OSC signal that includes information of the transient restoration of the signal from signal interruption, from the OSC transmitting unit 135 via the OSC 125, to the optical transmission device 100-2 that is downstream (step S508).

At the optical transmission device 100-2 that is downstream, the OSC receiving unit 131 receives the signal interruption information of step S506, via the OSC 113 (step S510). As a result, the wavelength count determining unit 136 determines whether variation of the number of wavelengths, i.e., the number of signal interrupted CHs is at least equal to a predetermined threshold. In the example depicted in FIG. 5, the wavelength count determining unit 136 is assumed to detect that the number of signal interrupted CHs is at least equal to the predetermined threshold (for example, 5 CHs or more) (step S511).

When the wavelength count determining unit 136 determines that the number of signal interrupted CHs is less than the predetermined threshold (for example, less than 5 CHs), while the process at step S513 is executed, processes according to the flowchart may be terminated without executing further processes other than that at step S513.

After step S511, during the period until the WSS controller 133 detects the addition of the ASE light (transient signal restoration), control of the WSS 121 is temporarily switched from the constant level control of the output implemented up to that point, to constant level control of the attenuation (ATT constant level control) (step S512).

Here, the OSC transmitting unit 135 further forwards the OSC signal carrying the signal interruption information received from the upstream station to the optical transmission device 100 that is a downstream station (step S513).

After the process at step S512, the OSC receiving unit 131 receives the information of the transient restoration of the signal as an OSC signal, accompanying the injection of the ASE light at step S508 by the optical transmission device 100 that is the upstream station. As a result, the WSS controller 133 performs switching to return the control of the WSS 121 to the normal constant level control of the output, from the ATT constant level control (step S514). Thus, the processes of the optical transmission device 100-1 that is upstream and the optical transmission device 100-2 that is downstream, performed when a signal interruption occurs end.

An optical transmission device 100 that is downstream from the optical transmission device 100-2 executes the same downstream processes as those of the optical transmission device 100-2.

Figure 6:
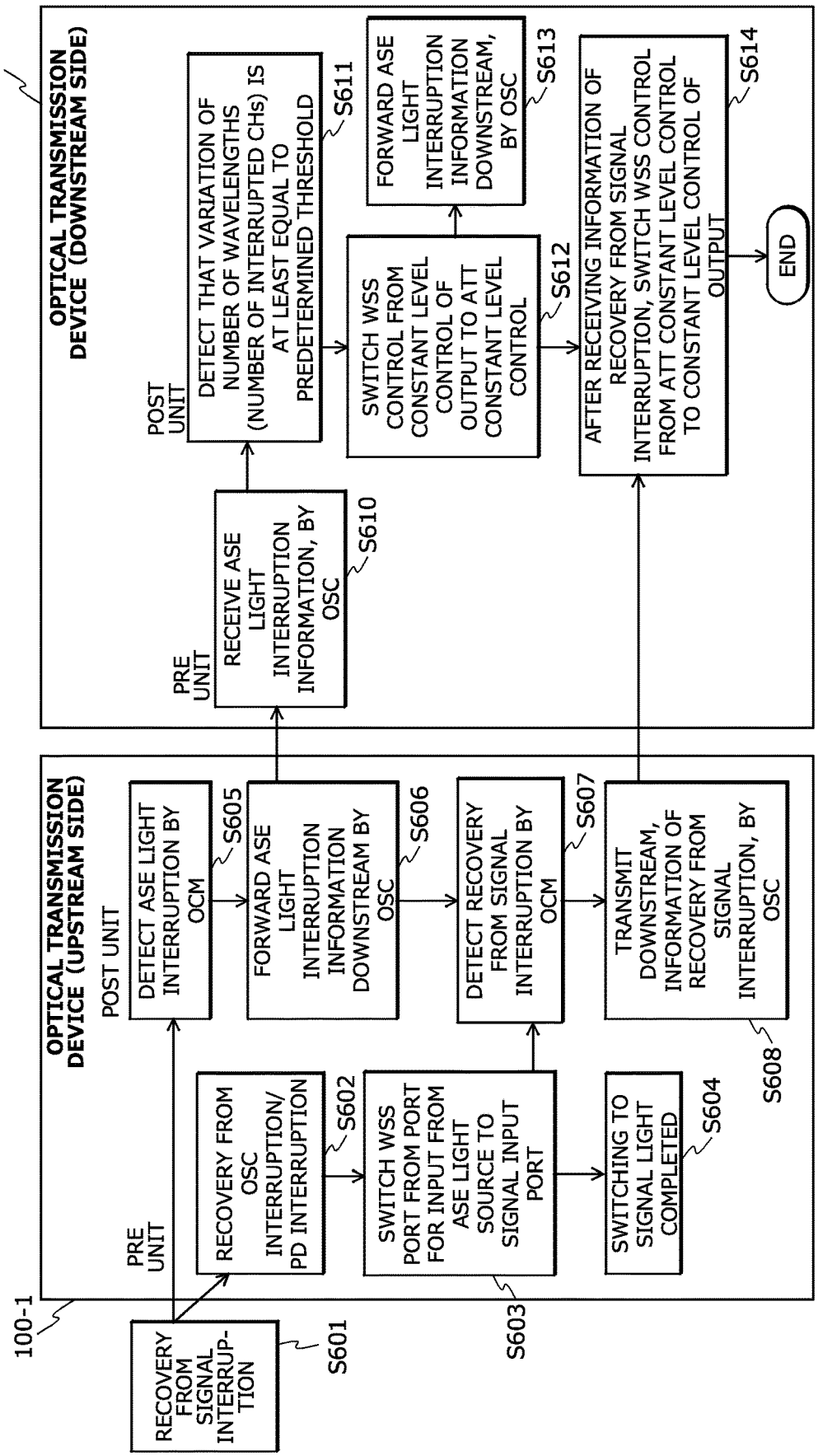

FIG. 6 is a flowchart depicting an example of transmission control of the optical transmission device when signal interruption is recovered from. FIG. 6 depicts control procedures implemented, respectively, by the optical transmission device 100-1 that is upstream and the optical transmission device 100-2 that is downstream in an instance in which the signal interruption is recovered from, after the transient signal recovery from the signal interruption occurring in the example depicted in FIG. 5.

Recovery from the signal interruption that occurred at a fault location X is assumed (step S601). For example, recovery from the signal interruption is by re-inserting a fiber of the transmission path 101 removed from the input port of the optical transmission device 100-1.

In this instance, at the optical transmission device 100-1 that is upstream, the OSC receiving unit 131 detects recovery from the signal interruption of the OSC signal and the light detecting unit 123 detects recovery from the signal interruption of the signal light (step S602). Based on the recovery from the signal interruption of the OSC signal output by the OSC receiving unit 131 or recovery of the signal interruption of the signal light by the light detecting unit 123, the transmission line interruption detecting unit 132 determines that input of the signal light to the optical transmission device 100-1 has recovered from the signal interruption.

Further, the transmission line interruption detecting unit 132 causes the WSS controller 133 to switch the port of the WSS 121 from the input port for input from the ASE light source 150 to the signal input port (step S603). As a result, the signal light on the restored transmission path 101 is output to the optical transmission device 100-2 that is downstream, via the WSS 121.

Further, recovery from the signal interruption due to step S601 is detected as recovery from the signal interruption by the OCM 124 (step S605). In this instance, based on detection of ASE light interruption by the OCM 124, the light interruption detecting unit 134 causes the OSC transmitting unit 135 to forward an OSC signal that includes ASE light interruption information, to the optical transmission device 100-2 that is downstream, via the OSC 125 (step S606).

When the switching from the ASE light to the signal light is completed by processes at step S603 (step S604), the OCM 124 detects a state of recovery from the signal interruption (step S607). As a result, the light interruption detecting unit 134 transmits an OSC signal that includes information of recovery from the signal interruption, from the OSC transmitting unit 135 via the OSC 125, to the optical transmission device 100-2 that is downstream (step S608).

At the optical transmission device 100-2 that is downstream, the OSC receiving unit 131 receives the ASE light interruption information of step S606, via the OSC 113 (step S610). As a result, the wavelength count determining unit 136 determines whether variation of the number of wavelengths, i.e., the number of signal interrupted CHs, is at least equal to the predetermined threshold. In the example depicted in FIG. 6, the wavelength count determining unit 136 is assumed to detect that the number of signal interrupted CHs of the ASE light is at least equal to a predetermined threshold (for example, 5 CHs or more) (step S611).

When the wavelength count determining unit 136 determines that the number of signal interrupted CHs of the ASE light is less than the predetermined threshold (for example, less than 5 CHs), while the process at step S613 is executed, the processes according to the flowchart may be terminated without executing further processes other than that at step S613.

After step S611, during the period until the WSS controller 133 detects recovery from the signal interruption, control of the WSS 121 is temporarily switched from the constant level control of the output implemented up to that point, to the constant level control of the attenuation (ATT constant level control) (step S612).

Here, the OSC transmitting unit 135 further forwards the OSC signal of the ASE light interruption received from the upstream station to the optical transmission device 100 that is a downstream station (step S613).

After the process at step S612, the OSC receiving unit 131 receives the information of the recovery from the signal interruption as an OSC signal, accompanying the recovery from the signal interruption by the optical transmission device 100 that is the upstream station at step S608. As a result, the WSS controller 133 performs switching to return control of the WSS 121 to the normal constant level control of the output, from the ATT constant level control (step S614). Thus, the processes of the optical transmission device 100-1 that is upstream and the optical transmission device 100-2 that is downstream, performed when recovery from signal interruption occurs end.

An optical transmission device 100 that is downstream from the optical transmission device 100-2 executes the same downstream processes as those of the optical transmission device 100-2.

Next, variation of signal light level during signal interruption in the conventional techniques and the embodiment is described with reference to FIGS. 7 and 8.

Figure 7:
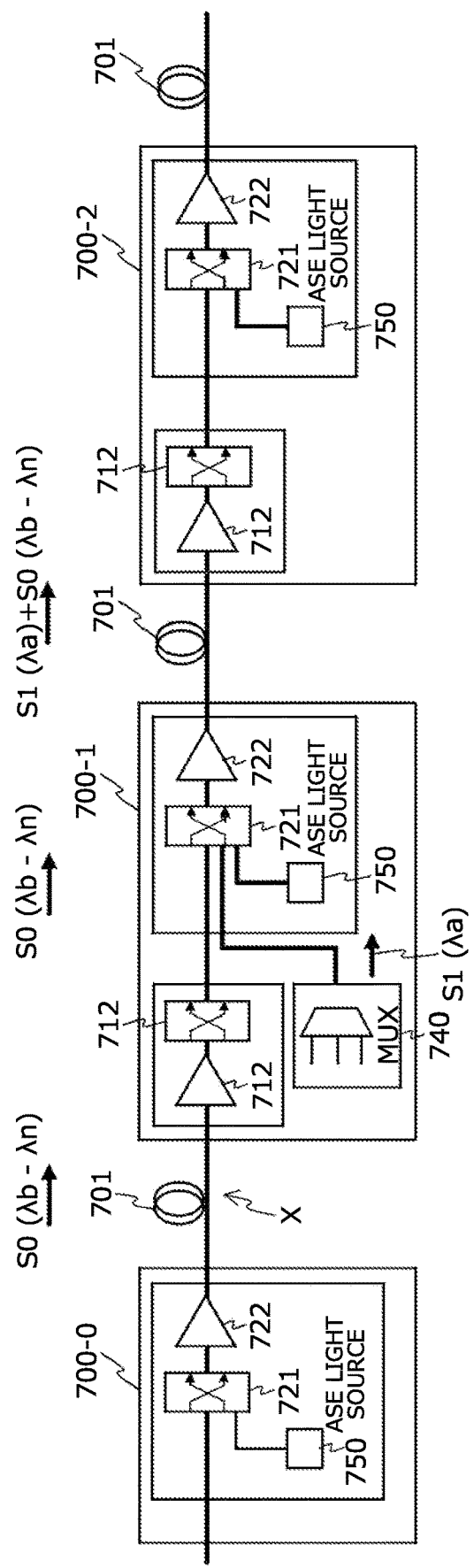
FIG. 7 is a diagram depicting an example of configuration of an optical transmission system of a conventional technique.

FIG. 7 is a diagram depicting an example of configuration of an optical transmission system of a conventional technique. An optical transmission device 700 depicted in FIG. 7 is a configuration example having a PRE unit and a POST unit, and includes optical amplifiers (AMPs) 711, 722, WSSs 712, 721, a MUX 740, and an ASE light source 750.

Further, similarly to the system configuration example described in the embodiment, an optical transmission device 700-0, an optical transmission device 700-1, and an optical transmission device 700-3 on a transmission path 701 are connected to one another. Further, during a normal state, the signal light S0 of the wavelengths λb to λn is assumed to be input to the optical transmission device 700-1, further, the optical transmission device 700-1 is assumed to inject the signal light (added light) S1 of the wavelength λa. During the normal state, the optical transmission device 700-1 combines and outputs the added light S1 of the wavelength λa and the signal light S0 of the wavelengths λb to λn by the WSS 721.

A system configuration example of the embodiment corresponding to FIG. 7 corresponds to that depicted in FIG. 4A and similarly to the conventional technique, during a normal state, the signal light S0 of the wavelengths λb to λn is assumed to be input to the optical transmission device 100-1, further, the optical transmission device 100-1 is assumed to add the signal light (added light) S1 of the wavelength λa. During the normal state, the optical transmission device 100-1 combines and outputs the added light S1 of the wavelength λa and the signal light S0 of the wavelengths λb to λn by the WSS 121.

Further, in the conventional technique depicted in FIG. 7, similarly to the embodiment, signal interruption is assumed to occur on the transmission path 701 between the optical transmission device 700-0 and the optical transmission device 700-1 (the fault location X).

Here, for both the conventional technique and the optical transmission device of the embodiment, after signal interruption in period t1, a certain amount of time (for example, about 10 seconds) is necessary until ASE light is injected.

Figure 8A:
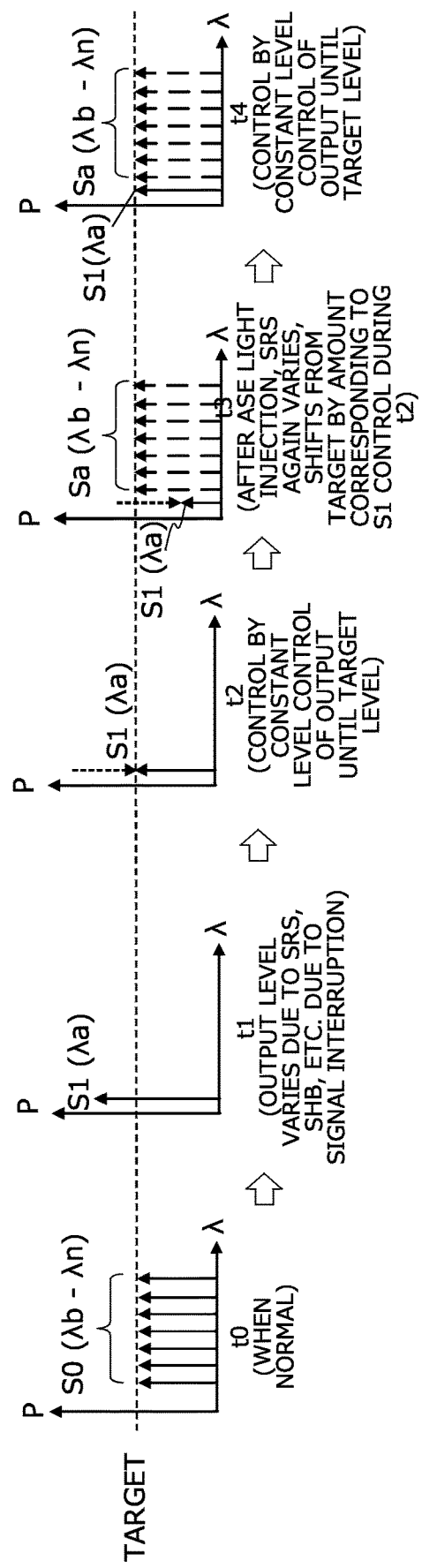
FIG. 8A is a diagram of variation of signal light level during signal interruption in a conventional technique.

FIGS. 8A and 8B are diagrams of variation of the signal light level during signal interruption in the conventional technique and the embodiment, respectively. FIG. 8A depicts variation of the level by the conventional technique after signal interruption; FIG. 8B depicts variation of the level by the embodiment after signal interruption. Variation of the signal level during periods from the signal interruption until transient signal restoration is described with reference to FIGS. 8A and 8B. In the figures, horizontal axes indicate wavelength λ and vertical axes indicate optical level P.

For example, charts of the conventional technique in FIG. 8A correspond to output of the WSS 721 depicted in FIG. 7. For example, charts of the embodiment in FIG. 8B, for example, correspond to output of the WSS 121 depicted in FIG. 4A.

With both the conventional technique shown in FIG. 8A and the embodiment shown in FIG. 8B, in a normal state (period t0) when signal interruption has not occurred, WSS control for the WSS is performed by constant level control of the output so that the optical level P of the signal light S0 of the wavelengths λb to λn is a predetermined target level.

Further, in the conventional technique in FIG. 8A, signal interruption is assumed to occur with respect to the wavelengths λb to λn (period t1). In this instance, the signal light S0 of the wavelengths λb to λn is no longer input to the optical transmission device 700-1. In the optical transmission device 700-1 of the conventional technique, as a consequence of the signal interruption of the signal light S0 of the wavelengths λb to λn, at the WSS 721, variation of the output level of the added signal light (added light) S1 occurs due to SRS, SHB, etc. For example, during period t1, the optical level of the signal light S1 exceeds the target level.

Further, in the optical transmission device 700-1 of the conventional technique, constant level control of the output is performed with respect to the WSS 721 so that the signal light S1 becomes the predetermined target level (period t2).

Thereafter, in the optical transmission device 700-1 of the conventional technique, after a predetermined time (for example, after about 10 seconds elapse), the ASE light Sa of the wavelengths λb to λn equivalent to the signal light S0 is injected (period t3). In this instance, in the optical transmission device 700-1 of the conventional technique, SRS again varies under the influence of the injection of the ASE light Sa of the wavelengths λb to λn, whereby the signal light S1 deviates from the target level by an amount equivalent to the amount of control of the signal light S1 during period t2. For example, during period t3, the optical level of the signal light S1 shifts to a level lower than the target level.

Therefore, in the case of constant level control of the output by the optical transmission device 700-1 of the conventional technique, the optical level of the signal light (added light) S1 does not converge to the target level before or after the injection of the ASE light Sa, and even after the injection of the ASE light Sa, it takes a certain amount of time until a period t4 of convergence.

In contrast, in the embodiment depicted in FIG. 8B, signal interruption is assumed to occur with respect to the wavelengths λb to λn (period t1). In this instance, in the optical transmission device 100-1 of the embodiment as well, as a consequence to the signal interruption of the signal light S0 of the wavelengths λb to λn, at the WSS 721, variation of the output level of the added signal light (added light) S1 occurs due to SRS, SHB, etc. For example, during period t1, similarly to the conventional technique, the optical level of the signal light S1 exceeds the target level.

Nonetheless, in the optical transmission device 100-1 of the embodiment, during the period t1 in which the signal interruption is detected, the WSS control for the WSS 121 is switched from constant level control of the output to ATT constant level control. As a result, the optical transmission device 100-1 performs operation for holding the output level of the added signal light (added light) S1 during period t1.

Thereafter, in the optical transmission device 100-1 of the embodiment, after a predetermined time (for example, after about 10 seconds elapses), the ASE light Sa of the wavelengths λb to λn equivalent to the signal light S0 is injected (period t2). In this instance, in the optical transmission device 100-1 of the embodiment, due to the injection of the ASE light Sa, WSS control for the WSS 121 is returned from ATT constant level control to constant level control of the output. As a result, during period t3, constant level control of the output is performed for the signal light S1 and the ASE light Sa, whereby the signal light S1 and the ASE light Sa may be concurrently converged to the target level.

In this manner, in the optical transmission device 100-1 of the conventional technique, the WSS control is fixed as the constant level control of the output and therefore, during the period until the ASE light Sa is injected, fluctuation of the output level of the added signal light (added light) S1 occurs. Furthermore, the output level of the signal light S1 again fluctuates due to the injection of the ASE light Sa. In this instance, the constant level control of the output performed during the period until the ASE light Sa is injected is meaningless control. In this manner, in the conventional technique, during the signal interruption, the output level of the added signal light (added light) S1 fluctuates unnecessarily and convergence to the target level takes time.

In contrast, according to the optical transmission device 100 of the embodiment, during the signal interruption, the WSS control is switched between constant level control of the output and ATT constant level control. As a result, ATT constant level control is performed for the period until the ASE light Sa is injected, whereby unnecessary fluctuation of the output level of the added signal light (added light) S1 may be prevented. Furthermore, WSS control is returned to the constant level control of the output due to the injection of the ASE light Sa, whereby WSS control suitable for the state after the signal interruption enables quick convergence of the added signal light (added light) S1 together with the ASE light Sa to the target level.

The optical transmission device 100 of the embodiment described above receives input of signal interruption information from another optical transmission device that detected signal interruption of the signal light on the transmission path and post-signal-interruption ASE light and has a wavelength selective switch (WSS) that drops/adds signal light. The controller of the optical transmission device 100, based on the input of the signal interruption information from the other optical transmission device, switches the WSS control for the output of the wavelength selective switch from the constant level control of the output for setting the signal light to a predetermined target level, to the constant level control of the attenuation for holding the attenuation amount of the signal light constant. Subsequently, after the input of the ASE light, the controller performs control of returning the constant level control of the attenuation to the constant level control of the output.

Further, the optical transmission system of the embodiment is disposed with multiple optical transmission devices on the transmission path and may be configured to include a first optical transmission device that is upstream on the transmission path and that detects signal interruption of the signal light, and one or more second optical transmission devices disposed downstream on the transmission path. In this system configuration, the first optical transmission device includes an ASE light source and a first controller. The first controller, when detecting signal interruption of the signal light input from the transmission path, outputs information of the signal interruption of the signal light downstream and thereafter, outputs, from the ASE light source, ASE light of the same number of wavelengths as the signal light. Further, the second optical transmission device includes a wavelength selective switch that drops/adds signal light and a second controller. The second controller, based on the input of the signal interruption information from the first optical transmission device, switches the output of the wavelength selective switch from the constant level control of the output for setting the signal light to a predetermined target level, to the constant level control of the attenuation for holding the attenuation amount of the added signal light constant. After the input of the ASE light, the second controller performs control of returning the constant level control of the attenuation to the constant level control of the output.

As a result, the optical transmission device 100 performs constant level control of the attenuation after signal interruption of the signal light input from the transmission path occurs until the ASE light is input, whereby the output level of the transmitted signal light is fixed and unnecessary fluctuation due to the constant level control of the output may be prevented. Further, after the input of the ASE light, the output level of the signal light including the ASE light may be quickly converged to the target level by the constant level control of the output.

Further, the controller of the optical transmission device 100, based on the input of the signal interruption information from the other optical transmission device, may implement the constant level control of the attenuation with respect to signal light added by the optical transmission device 100 and after the input of the ASE light, may implement the constant level control of the output with respect to the added signal light and the ASE light. As a result, constant level control of the attenuation is performed from the occurrence of the signal interruption of the signal light input from the transmission path until the input of ASE light, whereby the transmitted signal light, for example, the output level of the signal light (added light) added by optical transmission device is fixed and unnecessary fluctuation due to the constant level control of the output may be prevented. Further, after input of the ASE light, the output level of the added light and ASE light may be quickly converged to a target level by the constant level control of the output. As a result, the added light from the optical transmission device may be stably transferred downstream before and after signal interruption of the signal light.

Further, the controller of the optical transmission device 100 compares the number of wavelengths of the signal light at the time of signal interruption with a predetermined threshold and when the number of wavelengths of the signal light at the time of signal interruption exceeds the threshold, implements constant level control of the attenuation with respect to signal light added by the optical transmission device 100 of the controller. After input of ASE light, the controller may implement constant level control of the output with respect to the added signal light and the ASE light. In this manner, the number of wavelengths of the signal light at the time of signal interruption is considered, whereby optimal WSS control corresponding to the number of wavelengths subject to signal interruption may be performed.

Further, the controller of the optical transmission device 100 may respond to an output of information of signal restoration of the signal light subsequent to information of the dropped connection of the ASE light, when the other optical transmission device restores the interrupted signal light. When the interrupted signal light from the other optical transmission device is restored, the controller implements constant level control of the attenuation with respect to the signal light added by the optical transmission device 100 and the ASE light, based on the information of the dropped connection of the ASE light first input. Thereafter, when the interrupted signal light from the other optical transmission device is restored, the controller may implement constant level control of the output with respect to the signal light on the transmission path and the signal light added by the optical transmission device 100, based on the subsequently input information of recovery of the signal light from the signal interruption. As a result, the added light may be stably transmitted even when the ASE light that is transmitted after the signal interruption until recovery from the signal interruption is switched back to the signal light at the time of recovery.

According to one aspect of the invention, an effect is achieved in that even when signal interruption occurs on a transmission path, added signal light may be transmitted with the level thereof stabilized.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission device configured to receive an input of signal interruption information from a second optical transmission device that detects a signal interruption of signal light on a transmission path, the optical transmission device further configured to receive an input of amplified spontaneous emission (ASE) light after the signal interruption of the signal light on the transmission path, the optical transmission device comprising:
    a wavelength selective switch configured to drop a portion of the signal light on the transmission path and/or add other signal light to the signal light on the transmission path;
    a memory; and
    a processor coupled to the memory, the processor configured to:
        switch, based on the input of the signal interruption information from the second optical transmission device, control of output of the wavelength selective switch from a constant level control of the output, to a constant level control of attenuation for holding constant an amount of the attenuation of the signal light; and
        return the constant level control of the attenuation to the constant level control of the output, after the input of the ASE light.

2. The optical transmission device according to claim 1, wherein the constant level control of the output includes setting the signal light to a predetermined target level.

3. The optical transmission device according to claim 1, wherein the processor:
    implements, based on the input of the signal interruption information from the second optical transmission device, the constant level control of the attenuation with respect to the other signal light that is added by the optical transmission device; and
    implements the constant level control of the output with respect to the added other signal light and the ASE light, after the input of the ASE light.

4. The optical transmission device according to claim 1, wherein the processor:
    compares a variation of a number of wavelengths of the signal light at a time of the signal interruption and a threshold and when the variation of the number of wavelengths of the signal light at the time of the signal interruption exceeds the threshold, implements the constant level control of the attenuation with respect to the other signal light that is added by the optical transmission device; and
    implements the constant level control of the output with respect to the added other signal light and the ASE light, after the input of the ASE light.

5. The optical transmission device according to claim 1, wherein
    the second optical transmission device, at a time of recovery from the signal interruption of the signal light, outputs information of signal restoration of the signal light after information of disconnection of the ASE light,
    the processor:
        implements the constant level control of the attenuation with respect to the other signal light that is added by the optical transmission device and the ASE light, based on the information of disconnection of the ASE light, first input at the time of recovery from the signal interruption by the second optical transmission device; and
        implements the constant level control of the output with respect to the signal light on the transmission path and the added other signal light, based on the information of signal restoration of the signal light subsequently input at the time of recovery from the signal interruption by the second optical transmission device.

6. An optical transmission system, comprising:
a plurality of optical transmission devices disposed on a transmission path, including a first optical transmission device configured to detect signal interruption of signal light upstream on the transmission path and at least one second optical transmission device disposed downstream on the transmission path, wherein
the first optical transmission device has:
an ASE light source,
a first memory, and
a first processor coupled to the first memory, the first processor configured to output downstream, ASE light of a same number of wavelengths as that of the signal light, the ASE light being output from the ASE light source after signal interruption information of the signal light is output downstream when the signal interruption of the signal light that is input from the transmission path is detected, and
the at least one second optical transmission device has:
a wavelength selective switch configured to drop a portion of the signal light and/or add other signal light to the signal light,
a second memory, and
a second processor coupled to the second memory, the second processor configured to:
switch, based on an input of the signal interruption information output by the first optical transmission device, control of output of the wavelength selective switch, from a constant level control of the output, to a constant level control of attenuation for holding constant an amount of the attenuation of the other signal light added by the at least one second optical transmission device, and
return the constant level control of the attenuation to the constant level control of the output, after an input of the ASE light.

7. The optical transmission system according to claim 6, wherein the constant level control of the output includes setting the signal light to a predetermined target level.

8. The optical transmission system according to claim 6, wherein
the second processor compares a variation of a number of wavelengths of the signal light at a time of the signal interruption and a predetermined threshold and when the variation of the number of wavelengths of the signal light at the time of the signal interruption exceeds the predetermined threshold, implements the constant level control of the attenuation with respect to the added other signal light, and implements the constant level control of the output with respect to the added other signal light and the ASE light, after the input of the ASE light.

9. The optical transmission system according to claim 6, wherein
the first optical transmission device and the at least one second optical transmission device exchange the signal interruption information with each other by an optical supervisory channel (OSC).

10. An optical transmission method of an optical transmission device configured to receive an input of signal interruption information from a second optical transmission device that detects a signal interruption of signal light on a transmission path, the optical transmission device further configured to receive an input of ASE light after the signal interruption of the signal light on the transmission path, the optical transmission device having a wavelength selective switch configured to drop a portion of the signal light on the transmission path and/or add other signal light to the signal light on the transmission path, the optical transmission method comprising:
switching, by the optical transmission device and based on the input of the signal interruption information from the second optical transmission device, control of output of the wavelength selective switch from a constant level control of the output, to a constant level control of attenuation for holding constant an amount of the attenuation of the other signal light added by the optical transmission device; and
returning, by the optical transmission device, the constant level control of the attenuation to the constant level control of the output, after the input of the ASE light.

11. The optical transmission method according to claim 10, wherein the constant level control of the output includes setting the signal light to a predetermined target level.

12. The optical transmission method according to claim 10, wherein
the optical transmission device:
compares a variation of a number of wavelengths of the signal light at a time of the signal interruption and a threshold and when the variation of the number of wavelengths of the signal light at the time of the signal interruption exceeds the threshold, implements the constant level control of the attenuation with respect to the other signal light that is added by the optical transmission device; and
implements the constant level control of the output with respect to the added other signal light and the ASE light, after the input of the ASE light.

* * * * *